June 16, 1959    J. W. CHEEVER, JR    2,890,675
CORE HANDLING MACHINE
Filed Oct. 4, 1957    2 Sheets-Sheet 1
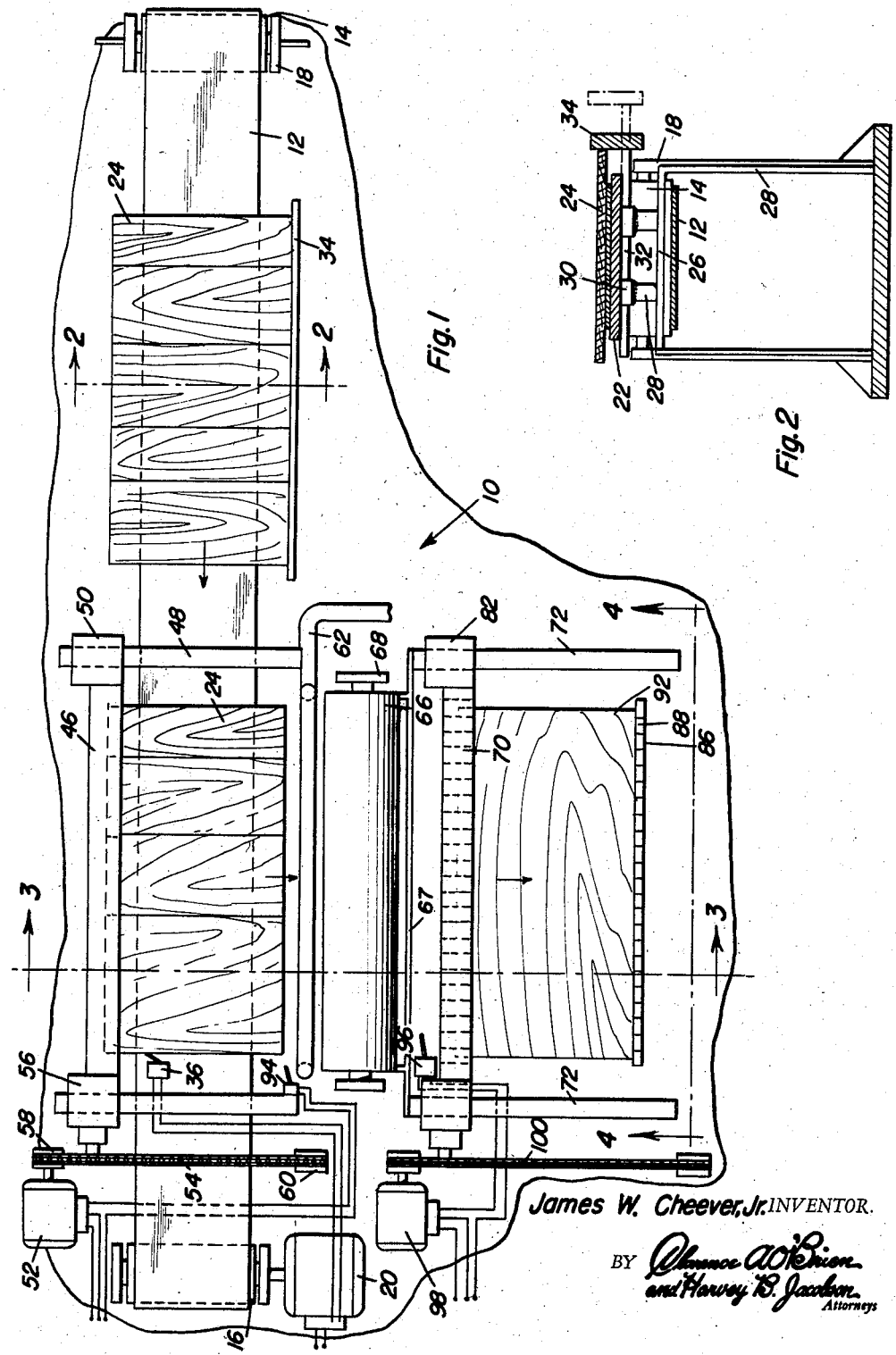
James W. Cheever, Jr. INVENTOR.

June 16, 1959  J. W. CHEEVER, JR  2,890,675
CORE HANDLING MACHINE
Filed Oct. 4, 1957  2 Sheets-Sheet 2
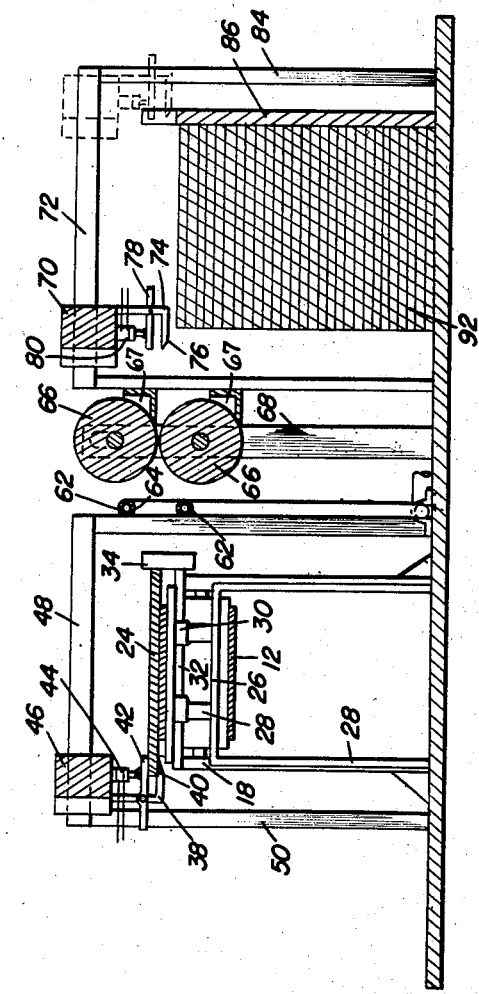
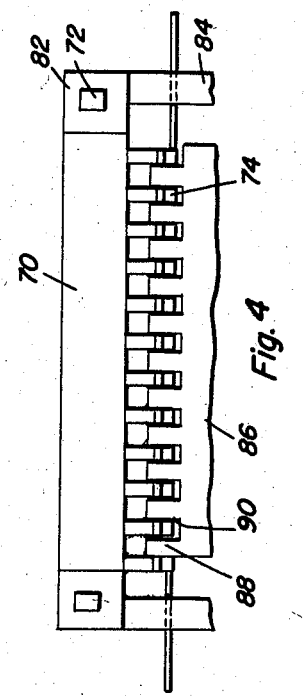
James W. Cheever, Jr.
INVENTOR.

United States Patent Office 2,890,675
Patented June 16, 1959

2,890,675

CORE HANDLING MACHINE

James W. Cheever, Jr., Astoria, Oreg.

Application October 4, 1957, Serial No. 688,371

6 Claims. (Cl. 118—6)

The present invention generally relates to a machine for laying core stock on a face sheet in the formation of plywood or similar laminated wood construction.

An object of the present invention is to provide a machine for transporting a plurality of core pieces in predetermined relationship and passing the same through a glue applicator and spreader and depositing the core pieces onto a face sheet.

A further object of the present invention is to provide a machine in accordance with the preceding object in which the entire operation is automatically carried out with the various control elements being adjustable for permitting different size core pieces to be employed to facilitate assembly of the core stock on different sizes of face sheets.

A further object of the present invention is to provide a machine for transporting core stock to a desired position and automatically depositing the core stock on the face sheet.

Other objects of the present invention will reside in its simplicity of construction, ease of operation, adaptation for various sizes and arrangements and its relatively high production rate and inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary plan view showing the layout of the machine of the present invention;

Figure 2 is a transverse, sectional view taken substantially upon a plane passing along section line 2—2 of Figure 1 illustrating the details of construction of the core piece and conveyor and the adjustability of the stop member therefor;

Figure 3 is a transverse sectional view taken substantially upon a plane passing along section line 3—3 of Figure 1 illustrating the construction of the core piece transferring mechanism, the glue applicator, the glue spreader and the clamp mechanism for receiving the core pieces from the glue spreader for depositing the same on the face sheets; and Figure 4 is a fragmental elevational view taken substantially upon a plane passing along reference line 4—4 of Figure 1, illustrating the stop mechanism for releasing the core pieces from the clamp members.

Referring now specifically to the drawings, the numeral 10 generally designates the core handling machine of the present invention which incorporates an elongated endless conveyor belt 12 encircling end rollers 14 and 16 journaled in suitable supports 18 and driven by an electric motor 20 at one end thereof. The endless belt 12 is provided with an underlying supporting member 22 disposed under the upper run thereof whereby the conveyor belt 12 may properly support and transport a plurality of core pieces 24 which may be of random width but which total a predetermined overall length and width. A transverse support member 26 is provided between upstanding supports 28 intermediate the rollers 14 and 16 and the transverse support 26 is provided with upstanding support members 28 each having a sleeve 30 at the upper end thereof slidably supporting a rod 32. One end of the rod 32 is connected to a stop plate 34 and with a plurality of transverse supporting members 26, upstanding members 28, sleeves 30 and rods 32, the stop plate 34 is supported in spaced parallel relation to one edge of the endless belt 12 whereby the plate 34 will form a stop for one end edge of the core pieces 24 thus centralizing the core pieces 24 on the endless belt 12 whereby the core pieces may be assembled by hand onto the conveyor belt 12 with the stop plate 34 being capable of being laterally adjusted in relation to the belt 12 and held in this position by any suitable means thus enabling the core pieces 24 to be centralized on the conveyor belt 12.

With the motor 20 energized by any suitable switch, the core pieces 24 will be moved longitudinally on the conveyor belt 12 until the leading edge of the leading core piece engages a limit switch 36 which stops the motor 20 and positions the core pieces 24 for engagement by a plurality of clamp members 38 having one leg 40 thereof underlying the edges of the core pieces 24 and the other member 42 being pivotal and energized by an electric solenoid 44 which is mounted along with the clamp members 38 on a movable bar 46 which is slidably disposed on transverse guide rods or rails 48 which overlie the conveyor belt 12 and which are supported by upstanding support members 50. After the core pieces 24 have been positioned by the endless belt 12 and the motor 20 stopped, the pickup bar 46 will be moved laterally so that the clamp members 38 will engage the core pieces 24 and simultaneously grip the same inasmuch as the limit switch 36 also energizes motor 52 and the solenoid 44. The motor 52 is provided with an endless drive chain 54 to which are connected by any suitable means the bearing blocks 56 which support the clamp bar 46 on the lateral guide rails 48. Thus by continuous operation of the chain 54, the clamp bar 46 will be caused to reciprocate back and forth across the endless belt 12 due to the connection between the blocks 56 and the chain 54 which travels with the chain around the end sprockets 58 and 60. The end sprocket 60 is suitably supported by a stand or supporting bracket (not shown). Disposed parallel to and adjacent the side edge of the conveyor belt 12 opposite from the normal position of the clamp bar 48 is provided a pair of vertically spaced tubular glue pipes 62 each having a plurality of spray apertures 64 therein which face the upper and lower surfaces of the core pieces 24 whereby glue is applied to both faces of the core pieces during passage thereof between the applicator pipes 62. Adjacent the pipes 62 but spaced therefrom is a pair of spreader rollers 66 which receive the core pieces 24 therebetween and spread the glue evenly over the upper and lower surfaces thereof. The spreader rollers 66 are also suitably supported from upstanding support members 68 and also spread glue which they receive from suitable troughs 67 mounted adjacent thereto.

An elongated bar 70 is mounted for sliding movement on lateral guides 72 and is provided with a plurality of clamping members 74 having a stationary clamping finger 76 for underlying the edge of the core pieces and a movable clamp finger 78 for overlying the same, the movable clamp member 78 being energized by a solenoid 80 whereby the advancing edges of the core pieces may be gripped and retracted by virtue of the clamp bar 70 being slidable on the lateral guide 72 by virtue of the bearing brackets 82. The lateral guide rails 72 may be supported by vertical uprights 84 and an upstanding member 86 in the form of a plate having a series of projections on the upper edge thereof which define notches 90 therebetween is provided for permitting passage of the clamp member 74 whereby the end edges of the core pieces will be engaged and prevented from moving past the plate 86 whereby the core pieces will drop upon a face sheet disposed on a stack of such sheets as indicated by the numeral 92 thus positioning the core pieces in the desired orientation. A limit switch 94 is provided for releasing the core pieces 24 from the clamp members 38 and causing the clamp bar 46 to be retracted and a limit switch 96 is provided for energizing the motor 98 which drives a chain 100 which operates the clamp bar 70 in the same manner as the bar 46 is operated. The position of the limit switches may be adjusted and varied with other suitable limit switches being provided for carrying out the operation of the component elements of the invention.

The basic principles of the invention reside in the provision of a conveying mechanism for conveying the core pieces to a desired position and providing a plurality of pickup members for engaging the end edges of the core pieces and forcing them through glue applying nozzles and then through spreader and applicator rollers and then releasing one end edge of the core pieces while picking up the other end edge and completely pulling the core pieces through the spreading applicator rollers and then laying the core pieces on the veneer sheet to make a full length of plywood in a single operation. The glue is usually applied by applicator rollers 66 which rotate and receive glue from the troughs 67. The spreader or applicator rolls 66 are set to take pieces of core from 1/20" to 3/16" thick and apply glue to both sides. Often a piece of core is thin and does not get a good glue spread and must be picked out by hand and thrown away. The glue applicator pipes or nozzles are to insure that every piece of core regardless of thickness will be covered on both surfaces with an adequate supply of glue. While the pickup clamps or grippers have been shown as being operated by solenoids, it is pointed out that they could be operated by air pressure, hydraulic pressure or mechanical means. The same may be said for the driving mechanism of the pickup assembly which may be driven by chains as shown in the drawings or may be driven by rack and pinion or by gears and crank arms or any other equivalent mechanical mechanism. All of the limit switches for the pickup bars as well as the limit switches for stopping and starting the conveyor 12 may be placed on a slotted supporting bar so that they may be adjusted to compensate for different lengths of core.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A core handling machine comprising an elongated endless core piece conveyor having a loading end and a discharge end, abutment means provided at one side of the loading end of said conveyor for engaging one edge of a core piece positioned thereon whereby the core piece may be centered relative to the conveyor, a first pick-up bar disposed alongside the discharge end of the conveyor and engageable with one side edge of the core piece, glue applying means including glue spreading rollers provided adjacent the discharge end of the conveyor, means for moving said first pick-up bar transversely of the conveyor for passing a core piece engaged thereby through said glue applying means, a second pick-up bar disposed adjacent the glue applying means and engageable with the other side edge of the core piece, means for moving said second pick-up bar for pulling the core piece completely through said glue applying means upon disengagement of the first pick-up bar from the core piece, and means for disengaging the core piece from the second pick-up bar and depositing the same onto a face sheet.

2. The combination of claim 1 wherein said glue applying means also includes a pair of vertically spaced pipes, each of said pipes having a plurality of discharge apertures therein, said apertures being disposed in facing relation for coating both sides of the core piece with a coating of glue, said glue spreading rollers being disposed immediately adjacent said pipes for spreading the glue evenly over both surfaces of the core pieces, and means independent of said pipes for supplying glue to said rollers.

3. The device as defined in claim 1 wherein said second pick-up bar includes a plurality of spaced clamp assemblies, said means for disengaging the core piece from the second pick-up bar including a plurality of stationary projections disposed in spaced relation, said projections permitting passage of said clamp assemblies therebetween but preventing passage of a core piece whereby the core piece may be disengaged from the clamp assemblies when the second pick-up bar is moved beyond said projections.

4. The combination of claim 1 together with limit switches for stopping said conveyor, effecting the pickup of the first pick-up bar, effecting the pickup of the second pick-up bar, releasing the first pick-up bar and returning the same to an initial position and returning the second pick-up bar to an initial position and restarting the conveyor.

5. The device as defined in claim 1 wherein said abutment means comprise a stop plate extending longitudinally along said one side of said conveyor in spaced relation therefrom.

6. The device as defined in claim 5 together with means for adjusting said stop plate laterally toward and away from the conveyor.

References Cited in the file of this patent

UNITED STATES PATENTS

| | | |
|---|---|---|
| 1,870,041 | Dike | Aug. 2, 1932 |
| 2,071,123 | Hubelmeyer | Feb. 16, 1937 |
| 2,191,070 | Cone | Feb. 20, 1940 |
| 2,291,651 | Robinson | Aug. 4, 1942 |
| 2,323,105 | Welch | June 29, 1943 |